United States Patent [19]
Compton

[11] Patent Number: 4,968,211
[45] Date of Patent: Nov. 6, 1990

[54] SELF-PROPELLED LOOSE BULK MATERIAL SLINGER VEHICLE

[76] Inventor: Ira Compton, 2434 Dayton Rd., Chico, Calif. 95928

[21] Appl. No.: 396,228

[22] Filed: Aug. 21, 1989

[51] Int. Cl.⁵ ............................................. B65G 31/00
[52] U.S. Cl. ................................... 414/502; 414/474; 414/489; 414/519; 414/528; 180/6.2; 280/43.17; 239/665; 239/679; 198/641; 198/302; 198/304
[58] Field of Search ............... 414/474, 489, 501, 502, 414/507, 519, 527, 528; 239/657, 661, 665, 668, 679; 180/6.2, 6.48; 280/43.17; 222/612, 627, 622; 198/302, 304, 638, 641, 642

[56] References Cited

U.S. PATENT DOCUMENTS

| | | |
|---|---|---|
| 2,125,088 | 7/1938 | Sinden . |
| 2,568,445 | 9/1951 | Grattan ............................. 239/657 X |
| 2,650,396 | 9/1953 | Koren ................................. 180/6.2 X |
| 2,657,990 | 11/1953 | Kuzell ............................... 198/641 X |
| 2,812,052 | 11/1957 | Doyer ................................ 198/641 X |
| 2,950,808 | 8/1960 | Gerberich . |
| 2,950,809 | 8/1960 | Sinden . |
| 3,195,711 | 7/1965 | Bogdan . |
| 3,332,534 | 7/1967 | Mills .................................. 198/641 X |
| 3,498,399 | 3/1970 | Gaskins ............................. 180/6.2 X |
| 3,515,313 | 6/1970 | Siems ................................ 180/6.2 X |
| 3,592,394 | 7/1971 | Sinden . |
| 3,760,933 | 9/1973 | Maldeis et al. .................. 239/665 X |
| 3,901,339 | 8/1975 | Williamson ...................... 180/6.2 X |
| 4,081,074 | 3/1978 | Stone ................................ 239/657 X |
| 4,144,962 | 3/1979 | Ide ....................................... 198/641 |
| 4,170,370 | 10/1979 | Schaefer ...................... 280/43.17 X |
| 4,519,465 | 5/1985 | Triplett ............................ 180/6.2 X |
| 4,781,513 | 11/1988 | Ajögren et al. ..................... 414/489 |

FOREIGN PATENT DOCUMENTS

| | | | |
|---|---|---|---|
| 0500981 | 2/1951 | Belgium ............................. 239/679 |
| 1757209 | 5/1973 | Fed. Rep. of Germany ...... 239/688 |
| 2719405 | 11/1978 | Fed. Rep. of Germany . |
| 2581602 | 11/1986 | Fed. Rep. of Germany ...... 414/501 |
| 1104488 | 11/1955 | France ................................ 239/679 |
| 2410594 | 8/1979 | France ............................. 280/43.17 |
| 0336315 | 10/1930 | United Kingdom ................ 239/668 |
| 2058533 | 4/1981 | United Kingdom ................ 239/661 |

Primary Examiner—Robert J. Spar
Assistant Examiner—John VandenBosche

[57] ABSTRACT

The invention provides a self-propelled fully operational loose bulk material slinger in a vehicle equipped to be driven. A slinger and hopper is mounted on a chassis supported by a triangular arrangement of road wheels. Individual powering of two road wheels, one on each side of the chassis, allows self-powered mobility and the road wheels can be steered for directional release of a material being stockpiled. A third small road wheel attached to swivel, balances the vehicle and can be retracted and extended to angle the vehicle for increasing and decreasing trajectory height of material being stockpiled. An engine and a hydraulic system provides mobility and mechanical adjustability to the vehicle. A stand-on control station allows the slinger vehicle according to the invention to be fully controlled by a single operator.

6 Claims, 6 Drawing Sheets

SELF-PROPELLED LOOSE BULK MATERIAL SLINGER VEHICLE

BACKGROUND OF THE INVENTION

1. Field of the Invention

This invention relates to devices useful for stockpiling loose bulk materials, especially agricultural products such as grains and nuts. The immediate invention is particularly directed towards a self-propelled slinger vehicle having aiming capacity for directional discharge and height adjustment for raising and lowering the height of the discharge projection.

2. Description of the Prior Art

Although material throwers using continuous belts and roller guides useful for stockpiling bulk materials are available, self-propelled slingers vehicles which can be steered for aiming and raised and lowered for varying pile height are not available. A search was therefore conducted to ascertain past art. The classes and subclasses examined included: 198/22, 25, 540, 631, 638, 640, 641, 642, and 914. Patents deemed cross-sectional of the art were considered the following;

In a boat loading device shown in U.S. Pat. No. 2,125,088, a belt aligned on rollers for piling bulk materials such as soda ash is shown at the end of a tubular material drop chute attached at the end of a crane-type material conveyer. This belt and roller arrangement without pliable paddles is limited to a short throw and although satisfactory for filling corners from a boom loader positioned above, the device would be inefficient for the long throws required for stockpiling bulk grains and nuts. Issued in July of 1938 to A. D. Sinden, the slinger shown is a pertinent example of developing past art for these devices.

More pertinent to my invention are U.S. Pat. Nos. 2,950,808, and 2,950,809. These two patents were issued almost simultaneously, the first to Gerberich on Aug. 30, 1960 and the second to A. D. Sinden on Aug. 30, 1960. The two devices have marked similarities with both depending on belt movement to throw materials to a stockpile location. The Sinden device is structured as a two-wheeled mobile device with a smaller swivel wheel attached to a handle in a center frontal position for steering and pulling the device manually from place to place.

U.S. Pat. No. 3,195,711 issued to Bogdan et al on July 20, 1965, shows use of pliable paddles on the end of a material loading elevator. The device is a simple rotating axle affixed with pliable paddles between end discs. Without other means, such as a belt arrangement, for controlling the throw of the material, the device would have very limited applications.

Most pertinent to one phase of my invention is the structure of the device of FIG. 5 in the A. D. Sinden U.S. Pat. No. 3,592,394, issued July 13, 1971. From our experiments with these devices, we feel that the Sinden device has the main thruster wheel wrongly positioned in the belt to provide a long and controllable material throw. Using a short pliable paddle with a rigid paddle support my slinger is highly efficient for longer material throws with a much smaller diameter thruster wheel than Sinden is able to use. In FIGS. 1 and 3 of the Sinden illustrations, the material appears to be thrown directly back at the supply hopper. The efficiency of the Sinden device seems somewhat restricted by throwing the materials over the top of the paddle wheel directly over the end of the supply conveyer structure positioned almost immediately in front of the material trajectory path.

In the slinger section of my device, an adjustable opening in the hopper feeds the bulk materials directly onto the belt below the thruster wheel paddles. The paddles do not pass through the mouth of the hopper as is shown in the various embodiments of the Sinden device. My material feeding method increases both the efficiency and the slinger throwing range. Notably in the past art patents examined was the absence of a self-powered hopperslinger combination mounted on road wheels which could be driven around the job site and towed from one use location to another some distance away.

SUMMARY OF THE INVENTION

To overcome deficiencies seen in the past art, in practicing my invention, I provide a self-propelled fully operational loose bulk material slinger in a road vehicle. My vehicle is a mobile slinger and hopper combination structured with road wheels which can be steered for directional release of a material being stockpiled and is mechanically pivotal horizontally to provide adjustable height trajectory.

In my device, a hopper sufficiently sized to accept volume delivery of loose bulk materials, especially agricultural products such as grains and nuts, is supported by superstructure attached to a chassis mounted over dual road wheels. The road wheels are arranged one on either side of the framework and a third smaller road wheel in a swivel mount is positioned centrally between angled bars at one end of the framework. The angled bars merge into a distal end relative to the hopper support with the distal end affixed with a trailer hitch plate. The angled bars form the trailer hitch tow bar useful for road towing the vehicular assemblage of the hopper-slinger combination. The side road wheels are individually powered by hydraulic motors and the hopper-slinger structure can be moved and steered from a stand-on control station. Power for the wheel motors is supplied by an internal combustion engine, a diesel preferred, located under the hopper at the end adjacent the swivel wheel. The slinger mechanics are located for discharge at the opposite end from the swivel wheel. The slinger is arranged with a continuous belt passing under a feed chute at the bottom of the hopper. The belt is powered by a drive roller positioned at the back side of the hopper chute adjacent the engine housing. The drive roller is powered by belt attachment to a drive wheel on the end of the engine drive shaft. A pitch roller at the discharge end of the slinger provides end support for the continuous belt which is pressured downward adjacent the frontal roller by a thruster wheel. The thruster wheel is primarily a paddle wheel with an axle and spaced disc ends resembling the unattached wheels and axle of a railroad car. Spaced longitudinally around the axle are short rectangular rigid vane supports. Attached longitudinally to the rigid vane supports are pliable sweeps resembling elongated paddles. In operation, granular materials, grains or nuts, loaded into the hopper pass through a controlled opening in the bottom hopper chute onto the moving belt. The thruster wheel turning relative to the belt movement sweeps the materials adding impetuous to the belt movement of the materials. In combination with the continuous belt, the thruster wheel provides my slinger with the capacity for throwing the materials a considerable distance. The throw distance is regulated by controlled power applied to the belt drive roller.

The engine drive shaft also provides power to pressure hydraulics for the road wheels and for raising and lowering the tow bar attachment end of the vehicle. The slinger vehicle can be driven forward or backward by hydraulic controls located at a stand-on station in front of the engine adjacent the swivel attached small road wheel. Steering is accomplished by speeding up and slowing down the individual hydraulic motors attached to each of the regular sized road wheels. The steering allows the vehicle to be turned in either direction or in a full circle and discharged materials can be deposited in any desired location. Mechanics for raising and lowering the tow bar attachment end of the vehicle are included in a hydraulic ram which raises and lowers the swivel attached small road wheel. All controls are operational at the stand-on station allowing one-man operation of the entire hopper-slinger vehicle. Self-powering allows the hopper-slinger vehicle to be moved around the job site and the tow bar provides attachment for a truck or tractor to tow the vehicle between job sites or to a garage for storage. The road wheels which have pneumatically inflated road tires allows the hopper-slinger vehicle according to the invention to be safely and legally towed along public highways.

Therefore, a primary object of the invention is to provide a combination self-powered hopper-slinger vehicle.

A further object of the invention is to provide a self-powered slinger for stockpiling small granular materials such as nuts and grains having adjustability for directional discharge and for vertical trajectory of the materials.

A still further object of the invention is to provide a self-powered slinger which can be steered and moved around at job sites and trailed by truck or tractor from job site to job site, the slinger assemblage riding on wheels equipped with road tires legally allowed on state highways.

A still further object of my invention is to provide a self-powered hopper and slinger in a combination which can be managed by a single operator at a stand-on control station.

The many advantages and useful objects of the instant invention will become best understood by reading descriptions of numbered parts in the specification with reference to like numbered parts illustrated in the included drawings.

DESCRIPTION OF A PREFERRED EMBODIMENT

Figure 1:
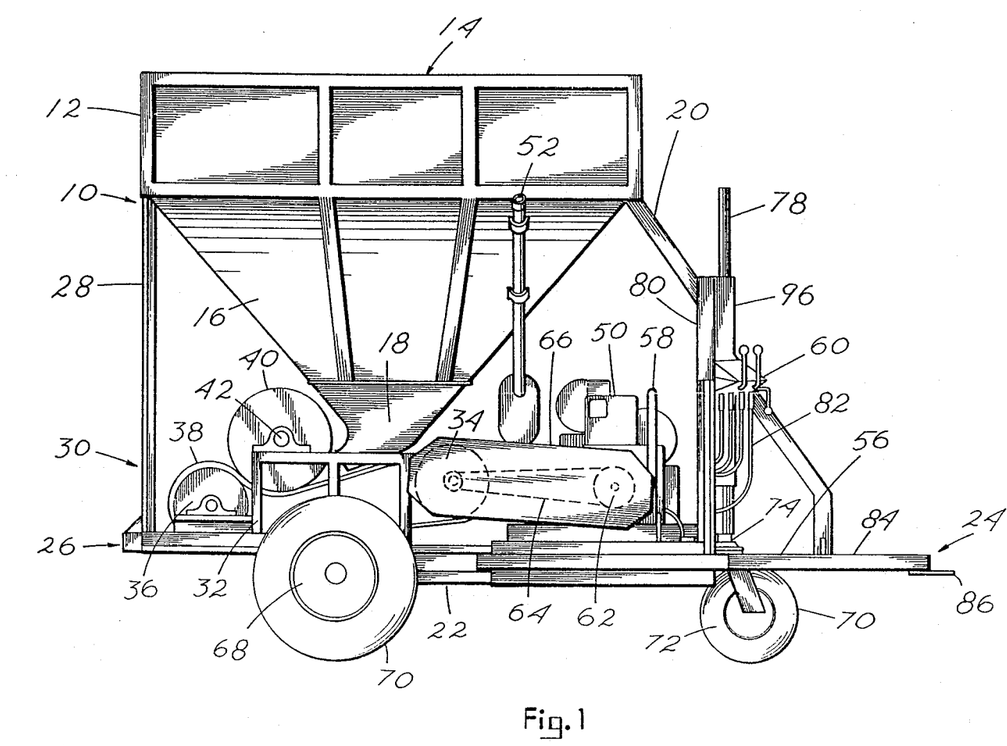
FIG. 1 is a side elevation of the self-powered slinger-hopper combination according to the invention illustrating the vehicular structure of the invention.

Referring now to the drawings where the self-powered hopper-slinger vehicle according to this invention is generally indicated by the numeral 10 and hereinafter referred to as slinger vehicle 10. As seen in FIG. 1, the combination structure forming slinger vehicle 10 includes hopper 12 having upwards an open top 14 and is funnel shaped 16 downwards to a bottom material releasing member, feed chute 18. Hopper 12 is supported by upwardly angled superstructure member 20 attached downwards to a horizontally disposed chassis 22 at a first chassis end designated front 24. Hopper 12 is supported at the opposite end by vertical superstructure members 28 which are also attached downwards to chassis 22 at a second chassis end designated rear 26. The designation front 24 and rear 26 are used hereinafter for descriptive orientation of the parts of slinger vehicle 10 relative to opposite longitudinal ends of chassis 22. Positioned rear 26 on chassis 22 is an improved typical granular material thrower, slinger 30. Slinger 30 is mounted to chassis 22 by slinger support frame 32. The operational parts of slinger 30 include drive roller 34 adjacent engine 50 and pitch roller 36 towards rear 26. A wide thrower belt, continuous belt 38, guided by continuous belt keepers 94 is arranged to pass under feed chute 18 around drive roller 34 and pitch roller 36. Cooperative with and adding impetuous to material movement is thruster 40. Thruster 40 is primarily a paddle wheel having an axle, thruster axle 42, and spaced end discs 44. Thruster 40 resembles the unattached wheels and axle of a railroad car. Spaced Longitudinally around thruster axle 42 are short rectangular rigid sweep supports 46. Attached longitudinally to rigid sweep supports 46 are pliable sweeps 48 resembling elongated paddles. Slinger vehicle 10 is self-powered by engine 50 mounted on chassis 22 under hopper 12 towards the end of chassis 22 designated front 24. Engine 50 can be any type of applicable powereing device with an internal combustion engine such as diesel being preferred. Engine 50 is clutch attached to engine driver pulley 62 and can be operationally controlled by clutch control 58. Exhaust from engine 50 is released through engine exhaust pipe 52 upward along the side of hopper 12. A driver pulley belt 64 housed under safety sheath 66 operates drive roller 34 providing operational power for slinger 30. Engine 50 also powers well known hydraulics operational through pressurized hydraulic oil in hydraulic oil tank 54 coursed through hydraulic lines 82 and controlled by hydraulic controls 60. Particular to slinger vehicle 10 is stand-on control station 56 where hydraulic controls 60 are located. The stand-on control station 56 arrangement allows full control and operation by a single operator of all mechanics, additionally described further on herein, applicable to the unique capabilities of slinger vehicle 10.

Figure 2:
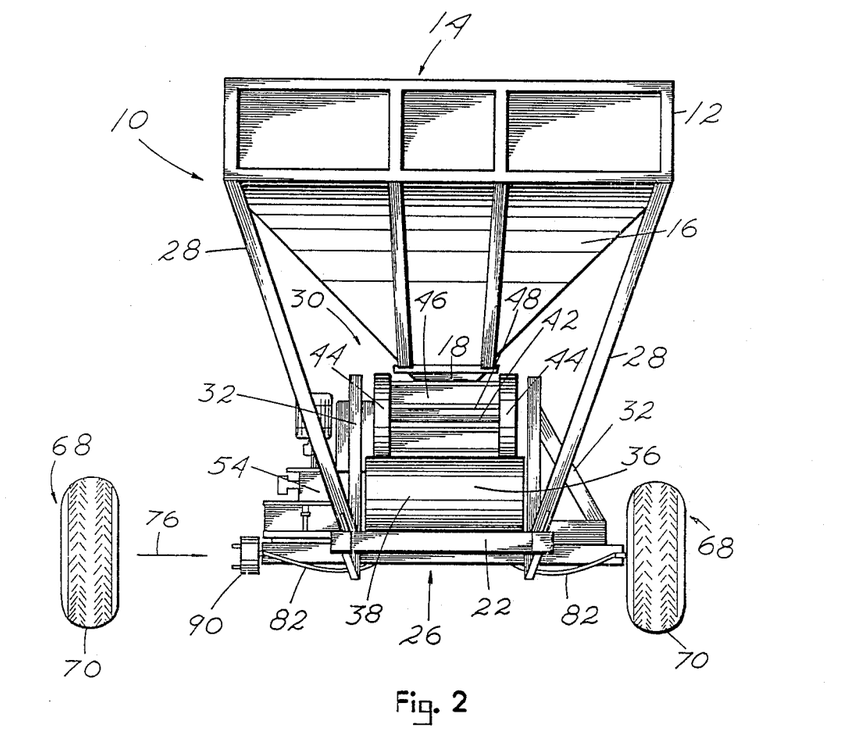
FIG. 2 shows the vehicle of the slinger-hopper combination in a view from the slinger discharge end with one street wheel removed illustrating powering of the individual wheels by hydraulic motors.
Figure 4:
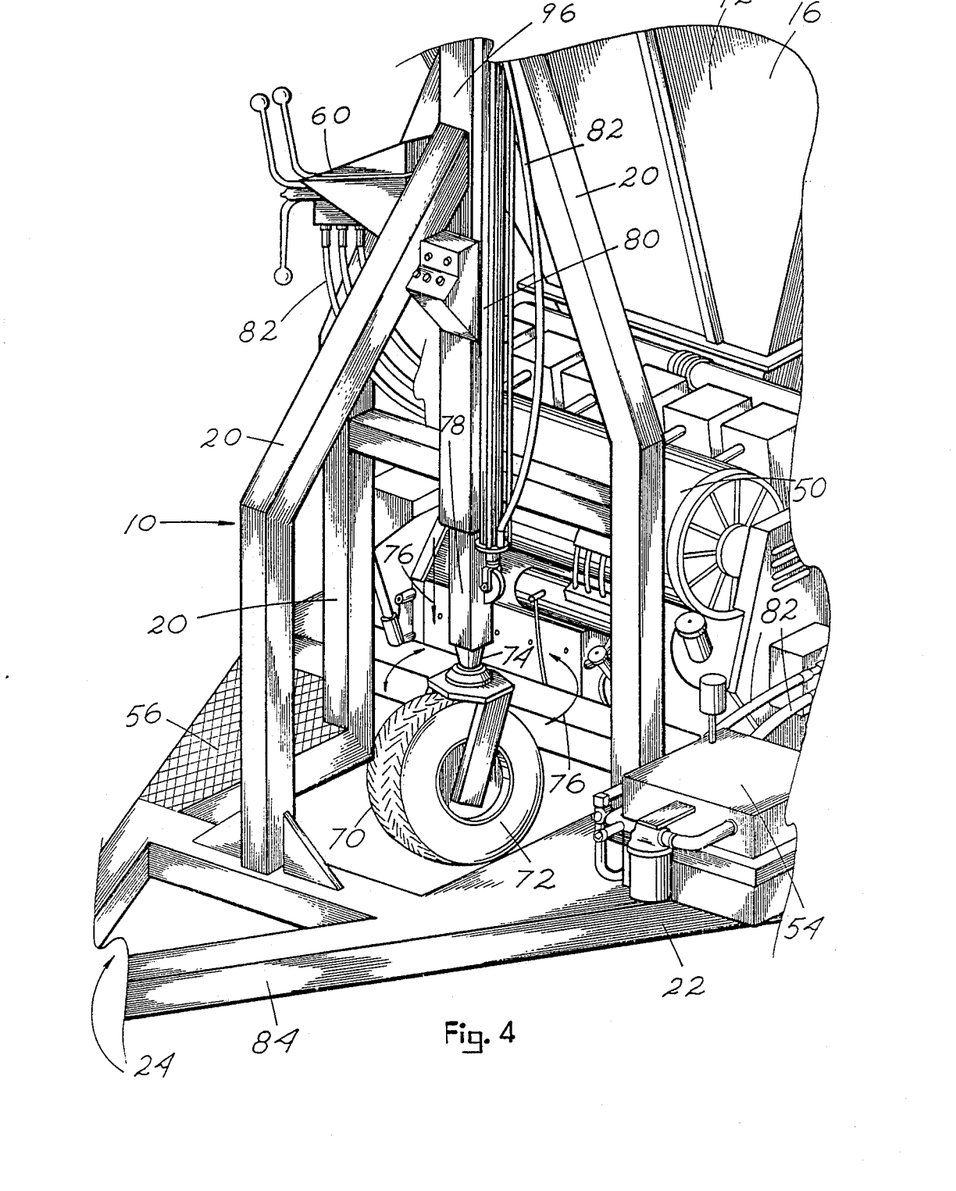
FIG. 4 is a partial perspective view at the tow bar end of the hopper-slinger vehicle showing the hydraulic ram and vertical boom structure of the swivel attached small road wheel. The stand-on control station is left in the illustration, the engine is shown centrally, and the hydraulic fluid tank is to the right in the illustration.
Figure 7:
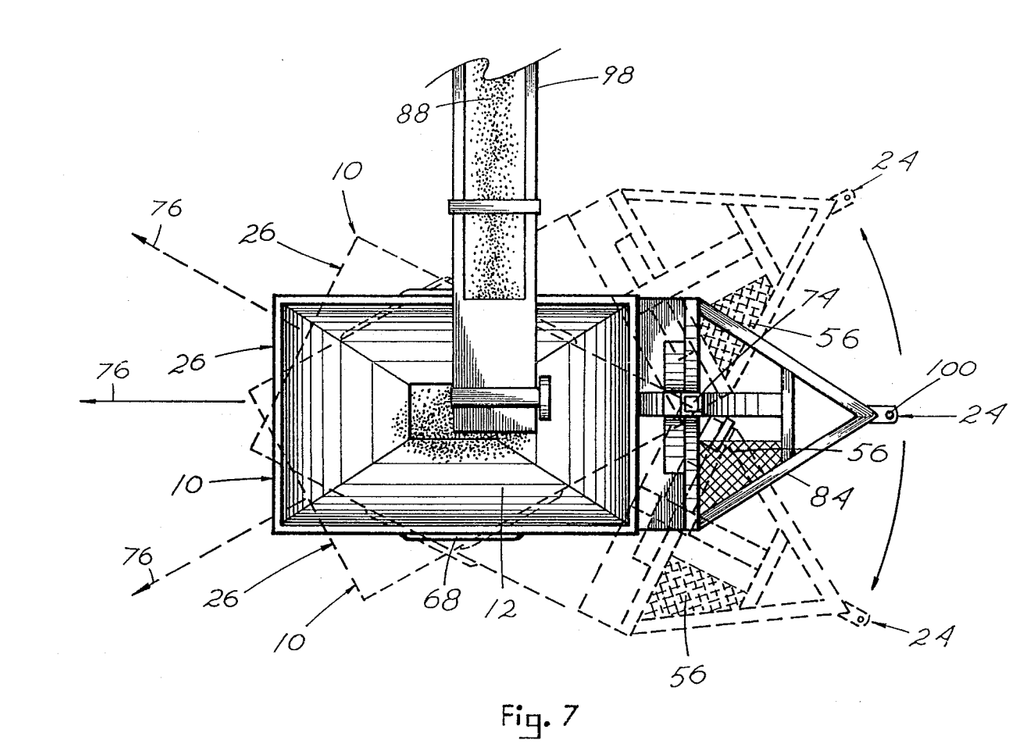
FIG. 7 is a top plan view of the hopper-slinger vehicle structure showing the hopper being loaded by materials from an overhead elevator and illustrating how the slinger vehicle with individually powered side road wheels can be controlled to rotate in a fixed position for directing discharging materials to various locations.

For mobility, slinger vehicle 10 is supported by two road wheels 68 mounted centrally, one on each side of chassis 22. Hydraulic motors 90, one for each road wheel 68, provide motive power for each wheel to move individually or together. Road wheels 68 are fitted with inflated road tires 70 so slinger vehicle 10 can move self-powered around a job site or be legally towed along a highway. For balancing, a small road wheel 72 is affixed by swivel attachment 74 at front 24 of chassis 22. A vertical mounting 96 slidably supports swivel wheel shaft 78 with hydraulic ram 80 arranged to raise small road wheel 72 up and down controlled by hydraulic controls at stand-on control station 56. Small road wheel 72 is also fitted with inflated road tires 70 for job site movement and can be retracted for highway towing. Small road wheel 72 is positioned towards front 24 of chassis 22 between angling side members of tow bar 84. See FIG. 4 for details. Tow bar 84 is the distal end fixture of chassis 22 at the end designated front 24. The angled side members of tow bar 84 merge terminally attached to trailer hitch plate 86. Trailer hitch plate 86 is apertured, hitch plate aperture 100, See FIG. 7, to be hook towed or to have a trailer hitch ball attached. Road wheels 68 are individually powered by hydraulic motors 90 controlled by hydraulic controls 60 at stand-on control station 56. See FIG. 2 of the drawings. Slinger vehicle 10 can move forward, backward, and can be steered controlled by power applied evenly or individually to hydraulic motors 90. Small road wheel 72 pivots freely and balancing chassis 22, follows any path set by the operator power steering road wheels 68.

Figure 3:
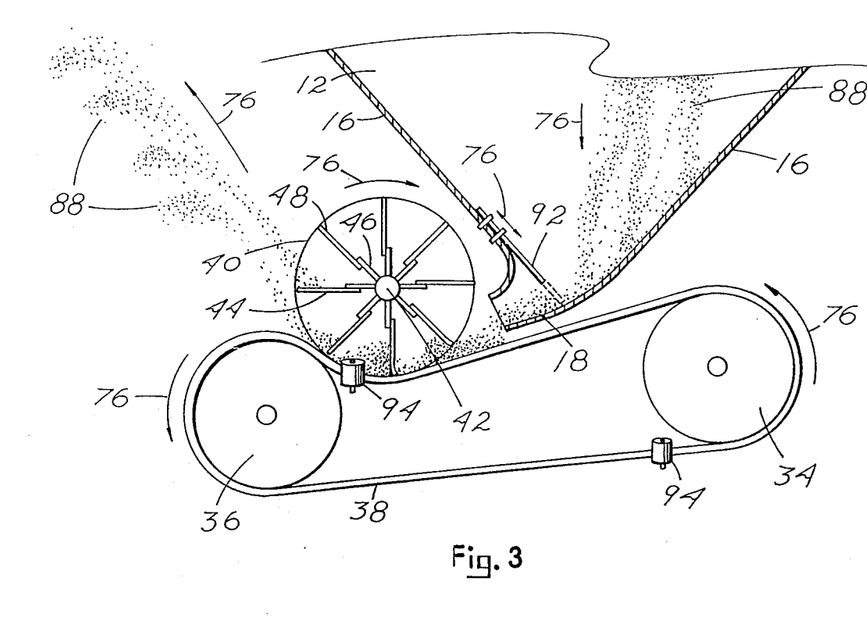
FIG. 3 is an illustrative drawing showing the rigid backed pliable paddles on the thruster wheel moving in combination with the continuous belt of the slinger. The adjustable door on the hopper feed chute is shown and the loading and discharge of materials is indicated. Revolving belt keepers maintaining the continuous belt positioned on the rollers are shown.
Figure 5:
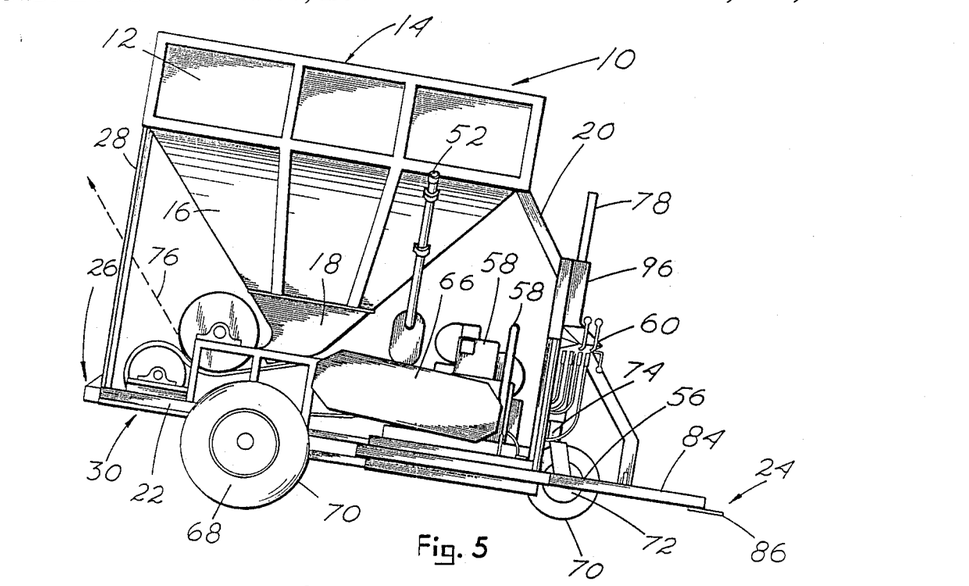
FIG. 5 is a side elevation of the slinger vehicle structure illustrating the swivel attached road wheel in a retracted position tilting the discharge end of the slinger upwards and increasing height trajectory of the discharged materials.
Figure 6:
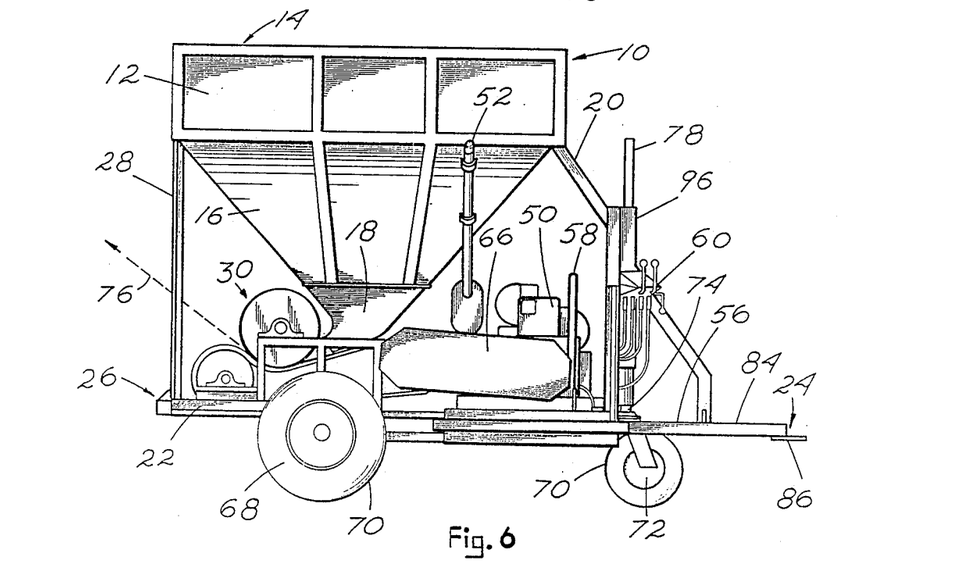
FIG. 6 shows the FIG. 5 slinger vehicular structure with the swivel attached road wheel extended leveling the hopper position and lowering material discharge trajectory height.

In operation, power is applied by clutch control 58 to engine driver pulley 62 and on to drive roller 34 via driver pulley belt 64. Continuous belt 38 moves as indicated by movement indicator arrows 76 causing thruster 40 and pitch roller 36 to rotate. Continuous belt 38 is maintained positioned on drive roller 34 and pitch roller 36 by continuous belt keepers 94 as shown in FIG. 3. Granular materials 88 deposited from elevator 98, see FIG. 7, through open top 14 of hopper 12 gravitate into feed chute 18. Granular materials 88 exit through a chute opening with the amount or type to be released by the opening size gauged by adjustable feed chute door 92. See FIG. 3. Granular materials 88 are deposited on the fast moving continuous belt 38 and being additionally swept by pliable sweeps 48 are thrown with considerable force over the top of pitch roller 36. The double force applied to the movement of granular materials 88 allows these materials to be thrown in a columnar stream a considerable distance and to be stockpiled in a desired location. For direction disposition of granular materials 88, slinger vehicle 10 can be pivotally turned in a fixed position by steering power applied to hydraulic motors 90. See drawing FIG. 7 where dotted lines illustrate the movement capabilities of slinger vehicle 10. For trajectory height, small road wheel 72 can be extended and retracted. See FIG. 5 and FIG. 6. FIG. 5 shows slinger vehicle 10 with small road wheel 72 retracted to raise the throw path of granular materials 88 as shown by movement indicator arrows 76. FIG. 6 shows slinger vehicle 10 with small road wheel 72 extended lowering the throw path shown by movement indicator arrows 76. The ability of slinger vehicle 10 to increase and decrease the height trajectory and to pivotally change the throw direction from a fixed position with these movements being mechanically possible while slinger 30 is in full operation, makes slinger vehicle 10 according to the invention a unique and practical device.

Even though I have described a particular embodiment of my invention in this specification, it is assumed that one skilled in the art could make modifications to an altered embodiment and accomplish similar results. Therefore, I reserve the right to make modifications to the invention so long as any changes made remain within the intended scope of my appended claims and should anyone else make modifications to the immediate invention which fall within the scope of my claims, I will consider the resultant embodiment to be my invention.

What is claimed is:

1. A self-powered loose bulk material slinger vehicle, comprising in combination:

a chassis having a front end and a rear end;

said chassis movably supported on any surface during use by at least three wheels;

two of said wheels being driven wheels mounted in a fixed orientation generally towards said rear end of said chassis;

at least one other of said wheels being a non-driven wheel mounted in a manner which allows free swivelling movement on said chassis at a position between said two of said wheels and said front end of said chassis;

a trailer hitch at said front end of said chassis for removably attaching said front end of said chassis to a towing vehicle;

an engine means affixed to said chassis;

a superstructure supporting a hopper on said chassis;

said hopper having a chute adapted for directing materials from said hopper to a material slinger;

said material slinger comprising a continuous carrier belt passed around end drums and a paddle wheel with a plurality of sweeps coacting with said continuous carrier belt to discharge material in a columnar stream;

said engine means providing power to operate said material slinger;

said driven wheels each being powered by said engine means to be independently movable either in a forward direction or in a rearward direction in a manner to provide forward or reverse movement to said slinger vehicle or to provide powered steering or rotational movement to said slinger vehicle;

hydraulic lifting means powered by said engine means for raising and lowering said at least one non-driven wheel;

whereby said rotational movement of said slinger vehicle caused by movement of said driven wheels permits the trajectory of said columnar stream to be adjusted in a horizontal direction and;

whereby said raising and lowering of said at least one nondriven wheel raises and lowers said front end of said chassis to permit the trajectory of said columnar stream to be adjusted in a vertical direction and also permits said trailer hitch to cooperate with a towing portion of said towing vehicle to allow said slinger vehicle to be towed.

2. The invention of claim 1 wherein said wheels attached to said chassis are wheels practical for highway travel and off-road uses.

3. The invention of claim 1 wherein said engine means includes an internal combustion engine.

4. The invention of claim 1 wherein said material slinger is powered by powering means and circuitry which include hydraulic motors with input and output hydraulic lines thereto pressurized by a hydraulic pump supplied by hydraulic fluid from a hydraulic reservoir tank affixed to said chassis with said pump mechanically operated by said engine means, respondent to operational controls at a control station on said chassis.

5. The invention of claim 1 wherein said hydraulic lifting means for raising and lowering said non-driver wheel includes a ram activated shaft slidably supported in a vertical mounting affixed to said chassis towards said front end with said shaft in said mounting controllable to raise and lower said non-driven wheel attached to a downward end of said shaft producing vertical bi-directional movement of said front end of said chassis providing variations in height adjustments of said rear end of said chassis relative to said front end of said chassis being guidance for adjustable trajectory of said columnar stream of materials to various heights for stockpiling.

6. The invention of claim 1 wherein said powering means and said circuitry adapted for powering said wheels in a manner to provide forward and reverse movement to said vehicle and for powered steering controlled from a control station on said chassis adapts said vehicle for turning bi-directionally in a complete circle without causing transnational movement to said vehicle.

* * * * *